United States Patent [19]
Källman et al.

[11] Patent Number: 5,742,929
[45] Date of Patent: Apr. 21, 1998

[54] ARRANGEMENT FOR COMPARING SUBJECTIVE DIALOGUE QUALITY IN MOBILE TELEPHONE SYSTEMS

[75] Inventors: Robert Källman, Bandhagen; Stefan Lidbrink, Stockholm, both of Sweden

[73] Assignee: Televerket, Farsta, Sweden

[21] Appl. No.: 654,753

[22] Filed: May 28, 1996

Related U.S. Application Data

[63] Continuation of Ser. No. 34,907, Mar. 19, 1993, abandoned.

[30] Foreign Application Priority Data

Apr. 21, 1992 [SE] Sweden ............................ 9201236

[51] Int. Cl.$^6$ ...................................... G10L 5/00
[52] U.S. Cl. ...................................... 704/251
[58] Field of Search ...................... 395/2.6, 2.63, 395/2.66

[56] References Cited

U.S. PATENT DOCUMENTS

| | | | |
|---|---|---|---|
| 4,737,976 | 4/1988 | Borth et al. | 379/58 |
| 5,008,941 | 4/1991 | Sejnoha | 381/43 |
| 5,033,088 | 7/1991 | Shipman | 381/43 |

FOREIGN PATENT DOCUMENTS

| | | | |
|---|---|---|---|
| 0298621 | 6/1988 | Italy | 379/58 |

OTHER PUBLICATIONS

Shimizu et al., "A New Pocket-Size Cellular Telephone for NTT High-Capacity Land Mobile Communication System", IEEE Veh. Tech. Conf., May, 1991, pp. 114–119.

*Primary Examiner*—Allen R. MacDonald
*Assistant Examiner*—Susan Wieland
*Attorney, Agent, or Firm*—Oblon, Spivak, McClelland, Maier & Neustadt, P.C.

[57] ABSTRACT

A system for comparing subjective dialogue quality in mobile telephone systems that include at least one mobile telephone exchange operating with a number of base stations, and at least one mobile radio unit for communicating with a respective base station. A first representation of the subjective dialogue quality that is experienced by a user of a first connection in the mobile telephone system is provided and compared with a representation produced for a second connection in a mobile telephone system. The system includes a transmitter for transmitting at least one predetermined and stored speech message that constitutes a second representation of a correct dialogue quality, and second means, including speech recognition means, for receiving and evaluating the speech message transmitted. The receiver produces in accordance with the recognizable parts of the speech message, a third representation of a dialogue quality experienced the user of the system. The second and third representation are compared to produce the first representation for comparison with the representation produced for the second connection.

10 Claims, 3 Drawing Sheets

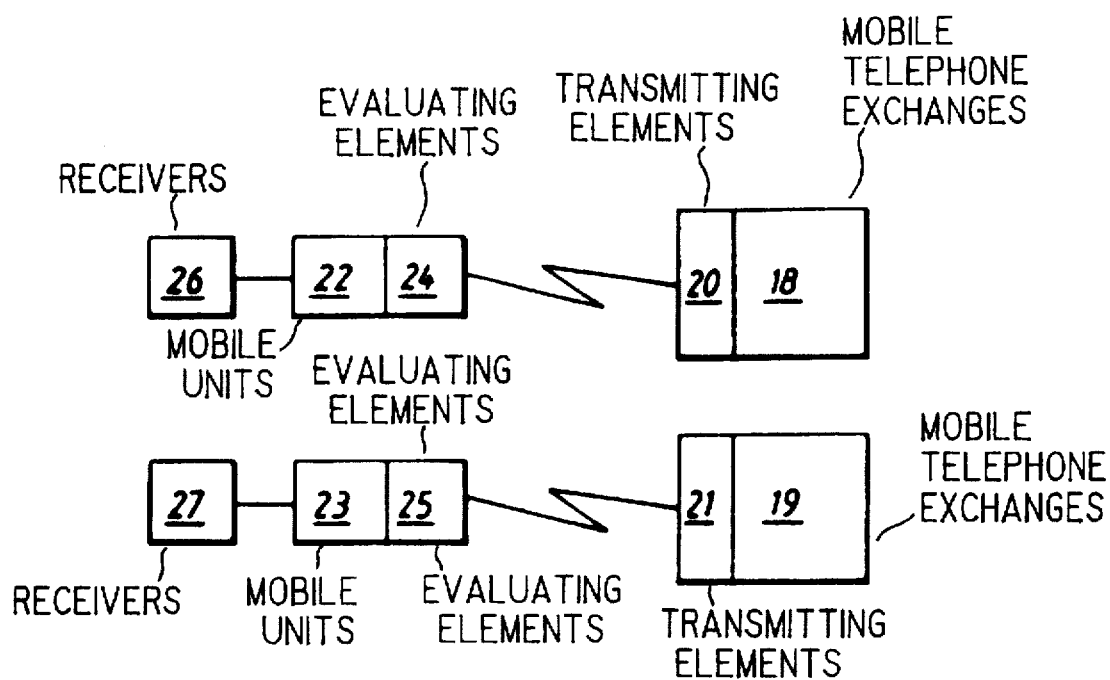

ARRANGEMENT FOR COMPARING SUBJECTIVE DIALOGUE QUALITY IN MOBILE TELEPHONE SYSTEMS

This application is a Continuation of application Ser. No. 08/034,907, filed on Mar. 19, 1993, now abandoned.

BACKGROUND OF THE INVENTION

The invention relates to an arrangement for comparing subjective dialogue quality in mobile telephone systems.

Mobile telephone systems usually include one or more mobile radio telephone exchanges operating with a number of radio base stations, and one or more mobile units for communicating with a respective one of the base stations. The mobile telephone exchanges are linked with each other by means of a public telephone network to form a mobile telephone system.

When a new mobile telephone system is being designed, or an existing system is being changed, the starting point must be a quality criterion which expresses the degree of correspondence between the transmitted information and the received information. If the information receiver is a person, and the information transmitted is speech, or music, measurable and reproducible quality criteria must be established.

It is known to measure the subjective dialogue quality as the intelligibility at the information receiver itself. In the case of speech, the intelligibility has been measured by determining how a number of physical test persons can comprehend a number of transmitted nonsense words, so-called logatoms. This is a fairly reproducible method for measuring the intelligibility of syllables. There are also methods for measuring word intelligibility. These methods are difficult to reproduce. It is for this reason that the arrangement for measuring transmission quality, in a mobile telephone system, at the information receiver, i.e. the person, is based on standardised signal forms, for example, test tones. The transmission quality has, therefore, also been measured and defined at a point in the transmission chain where the received signal is available in electrical form. It is characteristic of these measurements that they comprise a relatively large number of parameters and that a quality measure is obtained by weighting the said parameters. This quality measure does not correspond to the intelligibility of the dialogue to the subscriber.

There is no applicable, or standardised, measure for dialogue quality in the field of mobile telephony.

It has previously proved difficult to obtain an understanding of how an information receiver at a mobile unit perceives the dialogue quality during transmission of information, especially where the information receiver is a person, and the information is speech, or music. In particular, it has been difficult to make reproducible measurements and evaluations of the speech quality. No applicable, or standardised, arrangements have, therefore, been established for making these measurements and evaluations. When measuring speech intelligibility, so-called logatoms, that is to say, single-syllable nonsense words, have previously been used. These logatoms have constituted the information which has been sent to a number of information receivers. The information receivers in this case have consisted of a number of physical test persons. This is a fairly reproducible method of obtaining measurement results for the intelligibility of individual syllables. It is, however, very time consuming and difficult because the test person must be present during the measurements. The assessments among the different test persons have also had too wide a spread on many occasions.

To obtain a reproducible measurement and evaluation of the dialogue quality, standardised test tones have been used instead of speech signals, or music. The test tones have consisted of analog signals. The most common quality criterion in the case of analog signals is the signal/noise ratio. This quality criterion has then been translated into dialogue quality in very approximate conversion tables, for example

| SIGNAL/NOISE RATIO, dB | QUALITY |
|---|---|
| 0 | Occasional words comprehended and 90% of all sentences. |
| 6 | Almost all words comprehended. Acceptable quality for military mobile radio. |
| 12 | All words comprehended. Acceptable quality for civilian mobile radio. |
| 30 | Normal telephone quality. |
| 40 | Radio broadcast. |
| 60 | High fidelity. |

These tables are very approximate, and do not take account of those parameters which are really relevant for subjective dialogue quality. To obtain a more accurate conception of the said dialogue quality, attempts have been made to weigh together a larger number of technical parameters, for example, signal strength, distortion, signal/noise ratio, number of transfers, and so forth. To obtain a quality measure using these techniques which corresponds to reality and to a subscriber's conception of the dialogue, is immensely complicated.

It is the object of the present invention to overcome the forgoing problems by providing an arrangement for comparing subjective dialogue quality in mobile telephone systems which includes means for transmitting recorded speech messages and means for receiving and evaluating the recorded speech message.

SUMMARY OF THE INVENTION

The invention provides an apparatus for comparing subjective dialogue quality in mobile telephone systems that include at least one mobile telephone exchange operating with a number of base stations, and at least one mobile radio unit for communicating with a respective base station. A first representation of the subjective dialogue quality that is experienced by a user of a first connection in the mobile telephone system is produced and compared with a representation produced for a second connection in a mobile telephone system. This apparatus includes a transmitter for transmitting at least one predetermined and stored speech message that constitutes a second representation of a correct dialogue quality, and a receiver, including a speech recognition means, for receiving and evaluating the one speech message transmitted, and for producing, in dependence upon the recognisable parts of the speech message, at least one third representation of a dialogue quality experienced by a use of the system. The second and third representation are compared to produce the said first representation for comparison with the representation produced for the said second connection.

According to one aspect of the present invention, the transmitter form part of the said at least one mobile unit, the receiver form part of the said at least one telephone exchange, and a comparison is made of the subjective dialogue quality between different connections in the mobile telephone system.

According to another aspect of the present invention the transmitter form part of the said at least one telephone exchange, the receiver form part of the said at least one mobile unit, and a comparison is made of the subjective dialogue quality between different connections in the mobile telephone system.

According to a further aspect of the present invention, at least one telephone exchange of a first mobile telephone system and at least one telephone exchange of a second mobile telephone system include the transmitter, at least one mobile unit of the said first mobile telephone system and at least one mobile unit of the said second mobile telephone system include the receiver, and a comparison is made between the subjective dialogue quality of the first and second mobile systems.

Thus, the arrangement according to the present invention enables comparisons to be made of either the subjective dialogue quality in different mobile telephone systems, or the subjective dialogue quality between different connections in a mobile telephone system.

The foregoing and other features according to the present invention will be better understood from the following description with reference to the accompanying drawings, in which:

FIG. 1 shows, in the form of a block diagram, an arrangement according to the present invention for comparing subjective dialogue quality in mobile telephone systems, FIG. 2 shows, in the form of a block diagram, another arrangement according to the present invention for comparing subjective dialogue quality in mobile telephone systems, and FIG. 3 shows, in the form of a block diagram, a further arrangement according to the present invention for comparing subjective dialogue quality in mobile telephone systems.

DESCRIPTION OF THE PREFERRED EMBODIMENTS OF THE INVENTION

Figure 1:
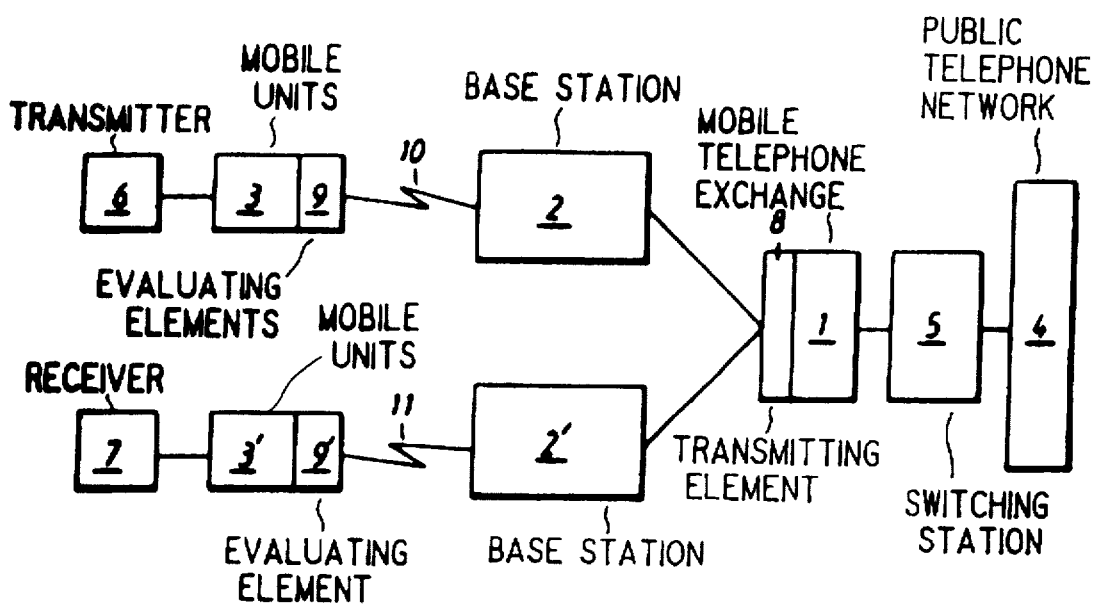

The arrangement shown in FIG. 1 of the drawings, in the form of a block diagram, is one embodiment of the present invention, and comprises one or more base stations 2, 2' which are connected to a mobile telephone exchange 1, and which operate with one or more mobile units 3, 3'.

The base stations 2, 2' together with the associated mobile telephone exchange 1 are part of a network system. The mobile telephone exchange 1 which constitutes the interface for the base stations 2, 2' to a public telephone network 4, is connected to the network 4 via a switching station 5.

During the transmission of a message from the mobile unit 3, via the base station 2 and the network system, to the mobile unit 3' via the base station 2', the said message is exposed to interferences. The result of these interferences is that the transmitted message and the received message do not completely correspond to one another. In practice, the message consists of spoken information, i.e. speech, which is transmitted between an information transmitter 6 and information receiver 7. The information transmitter 6 of the mobile unit 3 and the information receiver 7 of the mobile unit 3' are both physical persons. The possibility of the information receiver 7 comprehending words and meanings in the transmitted speech message is inversely related to the interference content in the system and constitutes an expression of the subjective dialogue quality of the mobile system, that is to say, the quality which is experienced by a user of the system.

In order to be able to produce first representations of this subjective dialogue quality, at least one of the mobile telephone exchanges of a mobile telephone system, i.e. the exchange 1 of FIG. 1, is provided with transmitting elements 8. The transmitting elements 8 transmit recorded, predetermined and stored speech messages to one or more associated mobile units 3, 3' via the respective base stations 2, 2'. The mobile units 3, 3' are provided with receiving and evaluating elements 9, 9'. The evaluating and receiving elements 9, 9' receive the recorded speech message transmitted by the transmitting element 8 of the mobile telephone exchange 1 via the respective base stations 2, 2'. The speech message transmitted by the transmitting element 8 constitutes a second representation. This second representation represents a correct speech quality, that is to say, a quality where one or more speech messages which have been transmitted by the element 8, are completely free of interference and in which an information receiver 7 in the telephone system preferably comprehends all words and sentences. The receiving and evaluating elements 9, 9' receives the transmitted speech message which, because of its passage through the system, no longer completely corresponds to the original speech message. The same element has stored therein the same speech message stored in transmitting element 8. The receiving and evaluating elements 9, 9' utilises speech recognition techniques to evaluate the received speech, and this involves calculating the number of correctly received phonemes, words and/or sentences by comparing the received speech with the recorded speech message. The receiving and evaluating elements 9, 9' receive the speech message and, depending on the recognised parts of the said received speech message, produce one or more third representations. These third representations represent a dialogue quality in which a number of phonemes, words and/or sentences, are not recognised. The said second representation is compared with the said third representations to produce the said first representation. This first representation (s) makes possible comparisons of subjective dialogue quality between the first connection 10 and a second connection 11.

Figure 2:
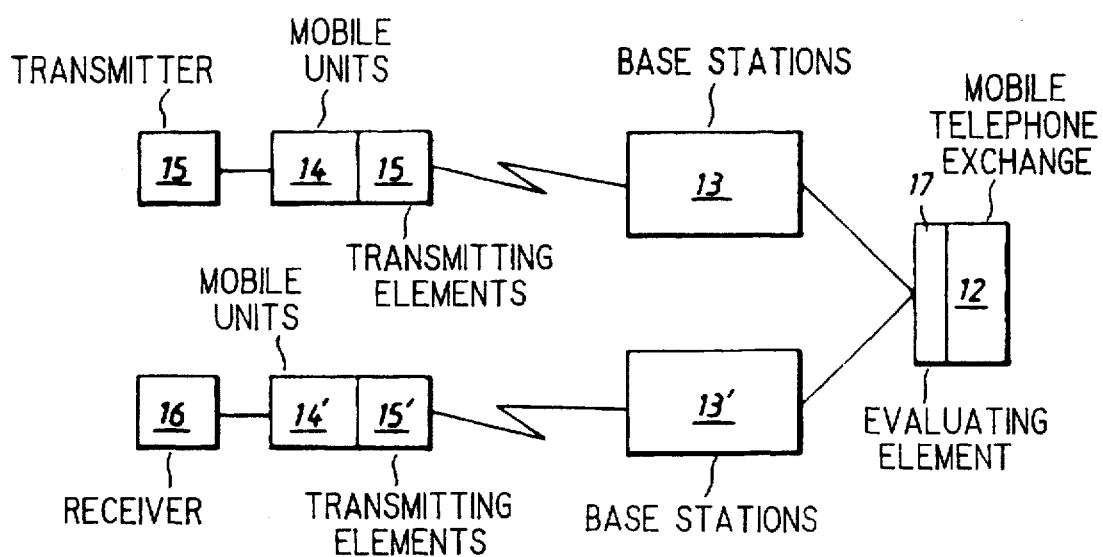

FIG. 2 shows, in the form of a block diagram, another embodiment of the present invention which operates with at least one mobile telephone exchange 12. As shown in FIG. 2, the arrangement for comparing subjective dialogue quality includes one or more base stations 13, 13' connected to the mobile telephone exchange 12, and one or more mobile units 14, 14' for respectively communicating with the base stations 13, 13'.

With the arrangement of FIG. 2, speech information is sent between an information transmitter 16 and an information receiver 16' which respectively consist of physical persons.

As stated above in relation to FIG. 1, the possibility of an information receiver 16' comprehending words and meanings in the said speech information is inversely related to the interference content in the system and constitute an expression of the subjective dialogue quality of the mobile system, that is to say, the quality which is experienced by a user of the system.

In order to be able to produce first representations of this subjective dialogue quality, one or more mobile units 14 and 14' are provided with transmitting elements 15 and 15'. These transmitting elements 15 and 15' transmit recorded, pre-determined and stored speech messages to the associated mobile telephone exchange 12 via the respective base stations 13, 13'. A receiving and evaluating element 17 is provided at the mobile telephone exchange(s) 12. The evaluating and receiving element 17 receives the recorded speech messages transmitted by the transmitting elements 15, 15' of the mobile units via the respective base stations 13, 13'. The speech messages sent by the transmitting element 15, 15' in the respective mobile unit 14, 14' are identical and constitute a second representation. This second representation represents a correct dialogue quality, that is to say, a quality where one or more speech messages which are transmitted are completely free of interferences and in which an information receiver 16' in the system preferably comprehends all words and sentences. The receiving and evaluating element 17 receives the transmitted speech message which no longer completely corresponds to the original speech message. The same element has stored therein the same speech message stored in transmitting element 15. The receiving and evaluating element 17 in the associated mobile telephone exchange 12 utilises speech recognition techniques to evaluate the received speech by comparing the received speech with stored speech message and, depending on recognised parts of the said received speech message, produces one or more third representations. These third representations represent a dialogue quality in which a number of phonemes, words and/or sentences are not recognised. The said second representation is compared with the said third representation in order to produce the said respective first representation. This first representation(s) makes possible comparisons of subjective dialogue quality between a first connection and a second connection in the said mobile telephone system.

The arrangement shown in FIG. 3 of the drawings, in the form of a block diagram, is a further embodiment of the present invention in which comparisons of subjective dialogue quality are made between a first and a second mobile telephone system.

As shown in FIG. 3, the first mobile telephone system includes at least one mobile telephone exchange 18 and the second mobile telephone system includes at least one mobile telephone exchange 19.

In order to be able to produce first representations of this subjective dialogue quality, one or more mobile telephone exchanges 18, 19 respectively of the first and second mobile telephone systems are provided with transmitting elements 20, 21. These transmitting elements 20, 21 transmit one or more recorded, predetermined and stored speech messages to one or more associated mobile units 22, 23 in the respective telephone system.

The mobile units 22, 23 are respectively provided with receiving and evaluating elements 24, 25. The evaluating and receiving elements 24, 25 receive the recorded speech message transmitted by the transmitting elements 20, 21 in the respective first and second mobile telephone exchange.

The speech messages transmitted by the transmitting elements 20, 21 are completely identical with each other and constitute a second representation. This second representation represents a correct speech quality, that is to say, a quality where one or more speech messages which are transmitted by the elements 20, 21, are completely free of interferences and in which an information receiver 26, 27 in the system preferably comprehends all words and sentences.

The respective receiving and evaluating element 24, 25 receives the transmitted speech message which no longer completely corresponds to the said original speech message. These same elements have stored therein the same speech message stored in transmitting elements 20 and 21.

The receiving and evaluating elements 24, 25 in the associated mobile unit 22, 23 utilise speech recognition techniques to evaluate the received speech by comparing the received speech with the stored speech message and, depending upon recognised pans of the receiving speech message, produce one or more third representations. These third representations represent a dialogue quality in which a number of phonemes, words and/or sentences are not recognised.

The said second representation is compared with the said respective third representations in order to produce the said first representation for the respective mobile system. This first representation(s) makes it possible to compare the subjective dialogue quality between the said first mobile telephone system and the said second mobile telephone system.

We claim:

1. A mobile telephone apparatus for comparing dialogue quality in mobile units comprising:

at least one mobile telephone system, each including a mobile telephone exchange, a plurality of base stations and a plurality of mobile radio units which communicate with the said base stations;

first means for transmitting at least one predetermined stored analogue speech message that constitutes a correct representation;

second means, including speech recognition means, for receiving said at least one analogue speech message transmitted by said first means which constitutes a received representation;

said second means evaluating a dialogue quality by comparing said received representation with a stored version of said correct representation and for producing a comparison representation therefrom depending on the recognized parts of said received message.; and said second means producing the comparison representations for at least two mobile radio units so that the dialogue quality between the two units can be compared.

2. An arrangement as claimed in claim 1, wherein the first means form part of the said at least one mobile unit, wherein the second means form part of the said at least one telephone exchange, and wherein comparisons are made of the dialogue quality between different connections in the mobile telephone system.

3. An arrangement as claimed in claim 1, wherein the first means form part of the said at least one telephone-exchange, wherein the second means form part of the said at least one mobile unit, and wherein comparisons are made of the dialogue quality between different connections in the mobile telephone system.

4. An arrangement as claimed in claim 1, wherein at least one telephone exchange of a first mobile telephone system and at least one telephone exchange of a second mobile telephone system include said first means, wherein at least one mobile unit of the said first mobile telephone system and at least one mobile unit of the second mobile telephone system include said second means, and wherein a comparison is made between the dialogue quality of the first and second mobile systems.

5. An arrangement as claimed in claim 1, wherein the second means include a reference system for the said correct representation.

6. An arrangement as claimed in claim 5, wherein the comparison representation is produced by the second means in dependence upon recognizable phonemes, and wherein the speech messages transmitted by the first means contain predetermined phonemes.

7. An arrangement as claimed in claim 1, wherein the speech messages transmitted by the first means contain predetermined phonemes.

8. An arrangement as claimed in claim 1, wherein the said original representation can be read out from the first means.

9. A mobile telephone system including an arrangement as claimed in claim 1 for comparing dialogue quality between different connections in the system.

10. A mobile telephone apparatus for comparing dialogue quality in mobile units comprising:

- at least one mobile telephone system, each including a mobile telephone exchange, a plurality of base stations and a plurality of mobile radio units which communicate with the said base stations;
- first means for transmitting at least one predetermined stored analogue speech message that constitutes a correct representation;
- second means, including speech recognition means, for receiving said at least one analogue speech message transmitted by said first means which constitutes a received representation;
- said second means evaluating a dialogue quality by comparing said received representation with a stored version of said correct representation and for producing a comparison representation therefrom in dependence upon recognizable phonemes; and
- said second means producing the comparison representations for at least two mobile radio units so that the dialogue quality between the two units can be compared.

* * * * *